Figure 1:
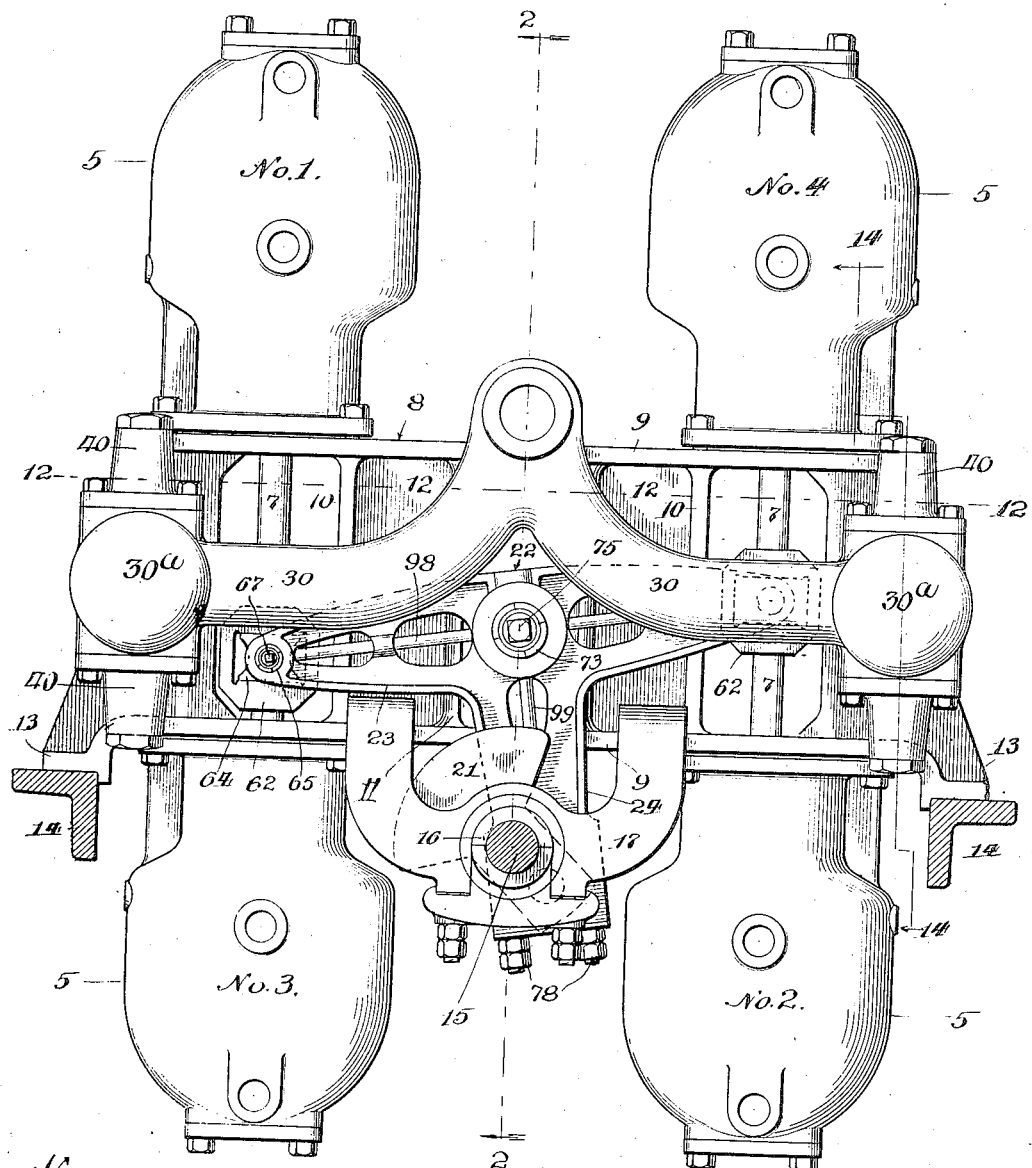

No. 898,103.

PATENTED SEPT. 8, 1908.

T. W. HEERMANS.
EXPLOSION ENGINE.
APPLICATION FILED FEB. 26, 1907.

6 SHEETS—SHEET 1.

Witnesses:
T. H. Alfreds
W. H. Hall

Inventor:
Thaddeus W. Heermans
by Poole & Brown
Attys.

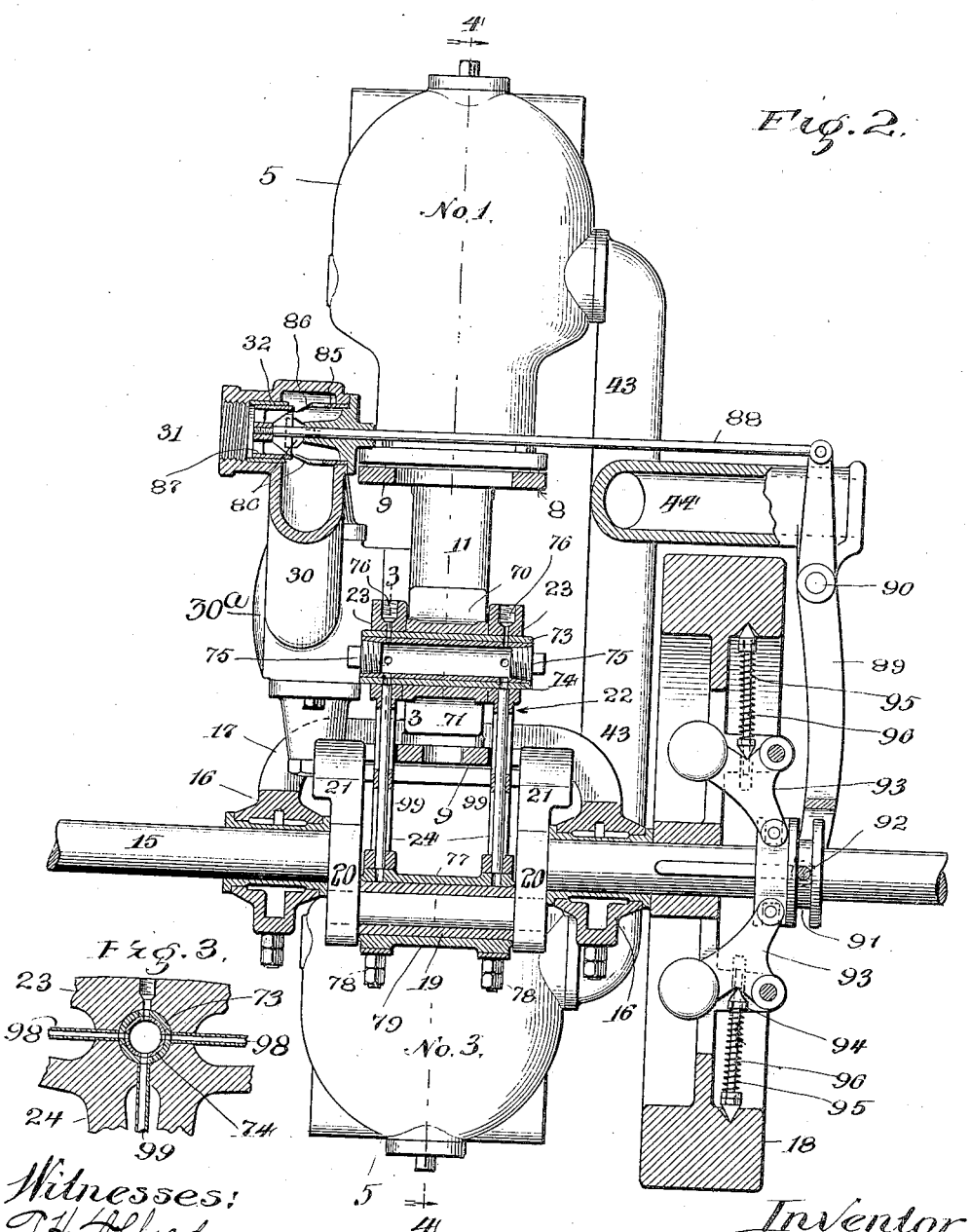

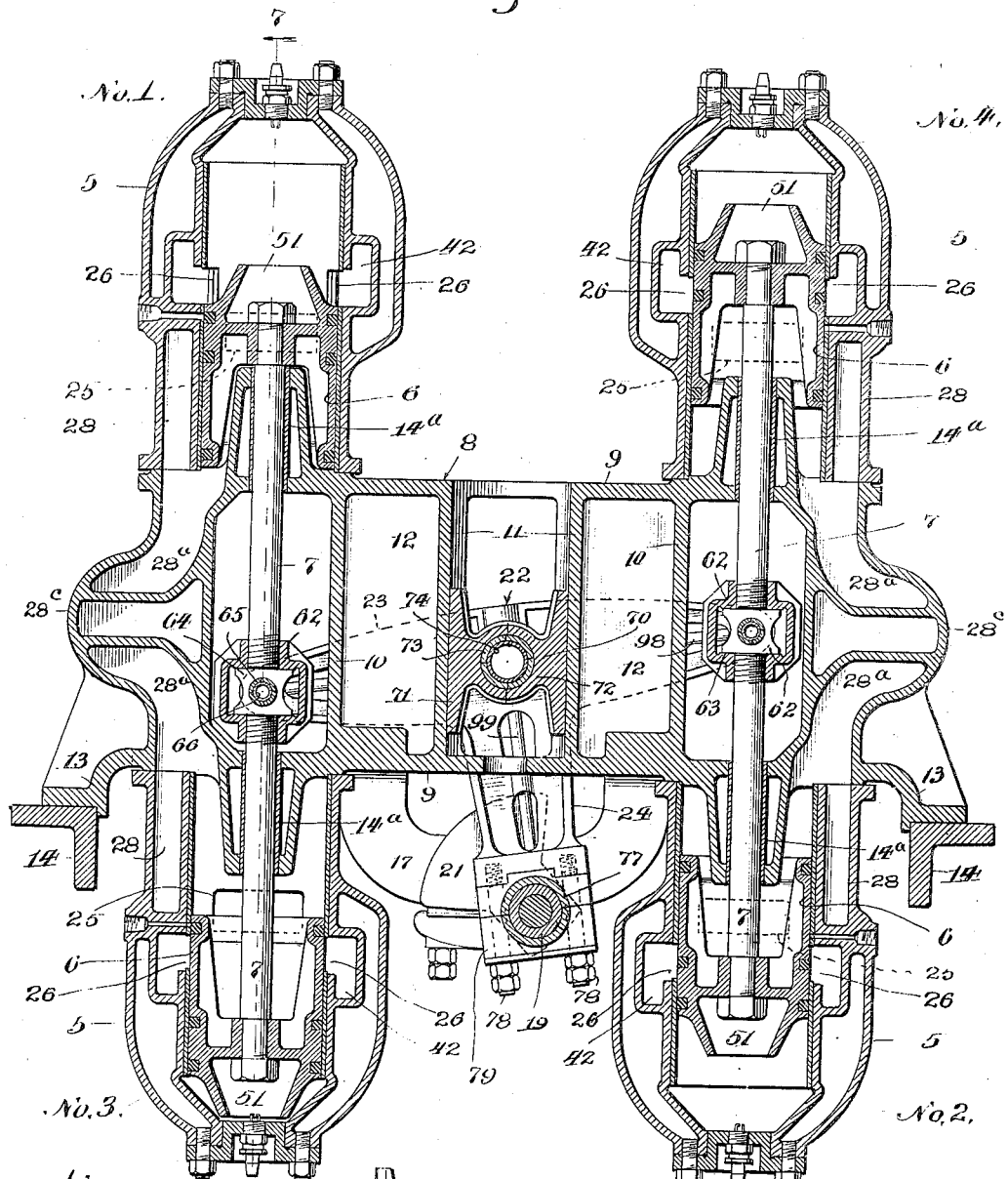

No. 898,103. PATENTED SEPT. 8, 1908.
T. W. HEERMANS.
EXPLOSION ENGINE.
APPLICATION FILED FEB. 26, 1907.
6 SHEETS—SHEET 4.
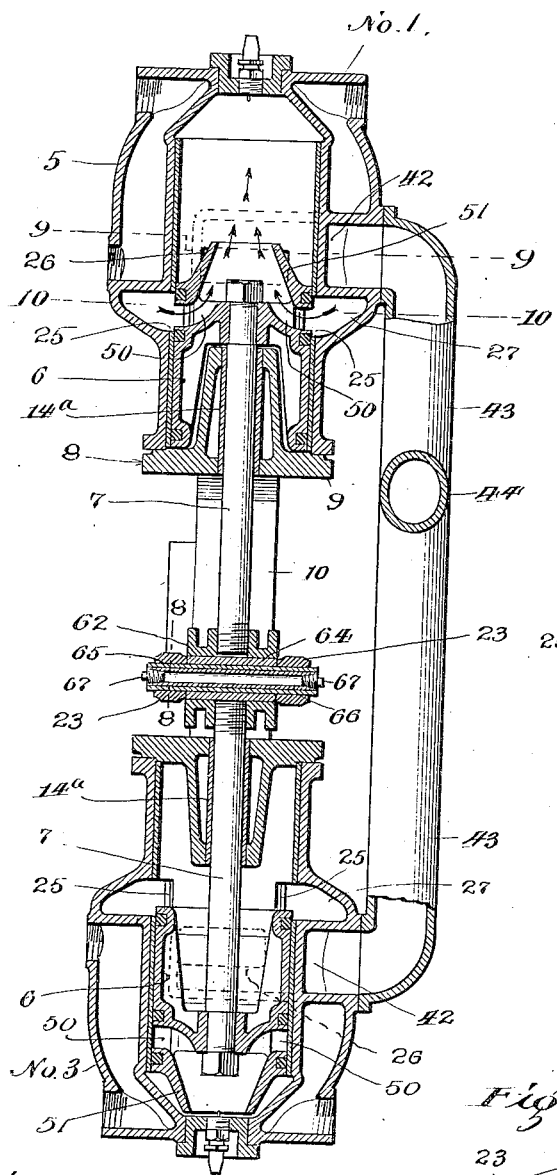
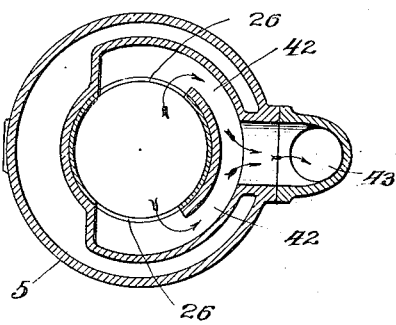
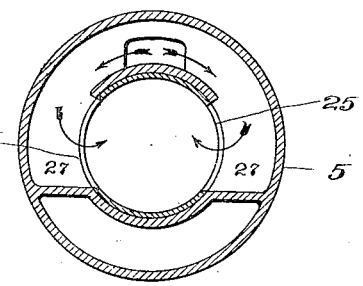
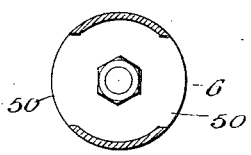
Witnesses:
Inventor:
Thaddeus W. Heermans
by Poole & Brown
attys.

No. 898,103. PATENTED SEPT. 8, 1908.
T. W. HEERMANS.
EXPLOSION ENGINE.
APPLICATION FILED FEB. 26, 1907.
6 SHEETS—SHEET 5.
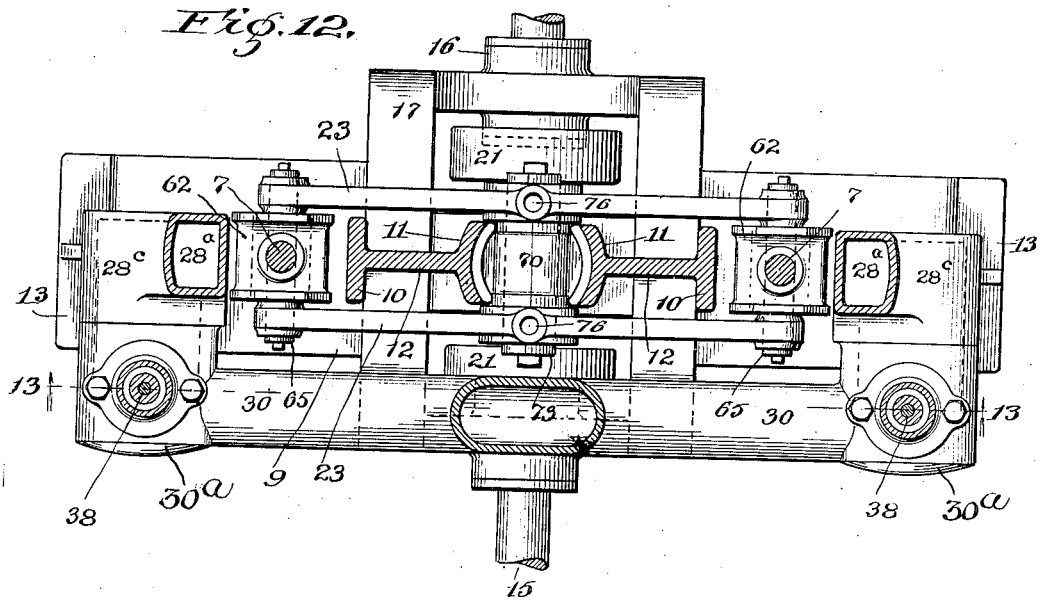
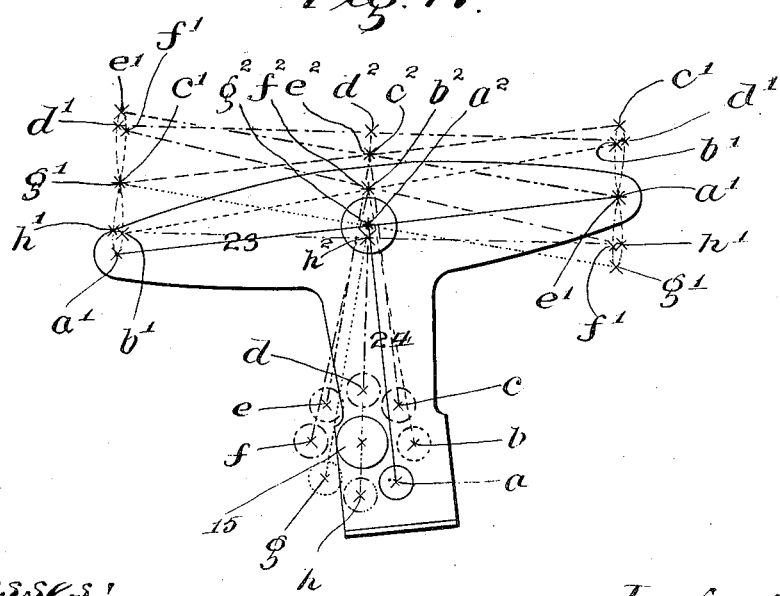

No. 898,103. PATENTED SEPT. 8, 1908.
T. W. HEERMANS.
EXPLOSION ENGINE.
APPLICATION FILED FEB. 26, 1907.
6 SHEETS—SHEET 6.
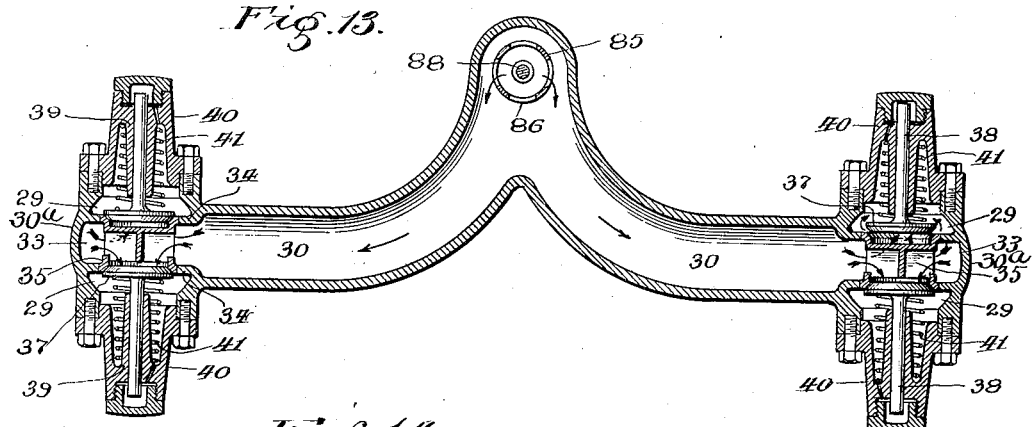
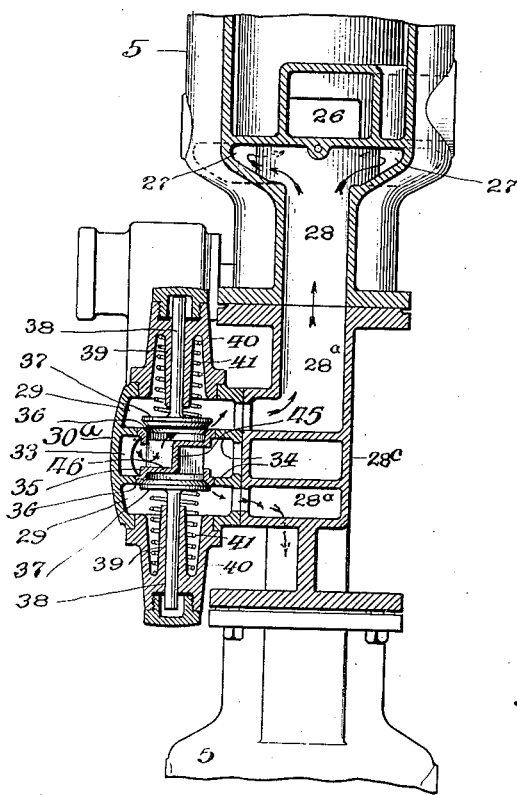
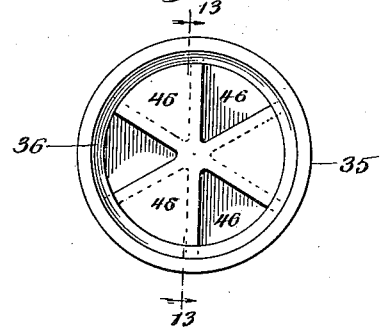
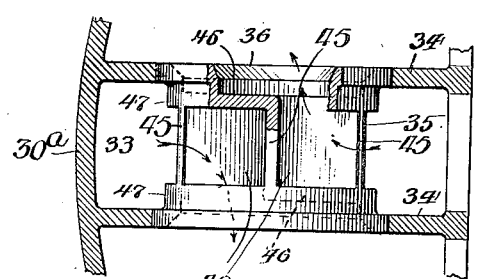
Witnesses:
T. H. Alfreds
N. H. Hall
Inventor:
Thaddeus W. Heermans
by Poole & Brown
Attys.

UNITED STATES PATENT OFFICE.

THADDEUS W. HEERMANS, OF EVANSTON, ILLINOIS.

EXPLOSION-ENGINE.

No. 898,103.   Specification of Letters Patent.   Patented Sept. 8, 1908.

Application filed February 26, 1907. Serial No. 359,472.

*To all whom it may concern:*

Be it known that I, THADDEUS W. HEERMANS, a citizen of the United States, and a resident of Evanston, in the county of Cook and State of Illinois, have invented certain new and useful Improvements in Explosion-Engines; and I do hereby declare that the following is a full, clear, and exact description thereof, reference being had to the accompanying drawings, and to the letters of reference marked thereon, which form a part of this specification.

This invention relates to improvements in engines, and the invention is shown as embodied in an internal combustion engine.

The invention consists in the matters hereinafter set forth and more particularly pointed out in the appended claims.

Among the objects of the invention is to provide an improved connection between the pistons of a multi-cylinder engine and the crank-shaft thereof, to produce an exceedingly simple and compact structure, as compared to the power developed by the engine and to otherwise improve the construction and operation of engines of the explosive type.

As shown in the drawings:—Figure 1 is a side elevation of an explosive engine embodying my improvements. Fig. 2 is a vertical section, taken on line 2—2 of Fig. 1. Fig. 3 is a cross-section, taken on line 3—3 of Fig. 2. Fig. 4 is a vertical section, taken on line 4—4 of Fig. 2. Fig. 5 illustrates a portion of the cross-head removed from the machine. Fig. 6 illustrates one of the yokes by which the rods of the pistons of two opposed cylinders are connected. Fig. 7 is a vertical section, taken on line 7—7 of Fig. 4. Fig. 8 is a cross-section, taken on line 8—8 of Fig. 7. Figs. 9 and 10 are transverse sections, taken on lines 9—9 and 10—10, respectively, of Fig. 7. Fig. 11 is a cross-section of one of the pistons, showing its ports. Fig. 12 is a horizontal section, taken on line 12—12 of Fig. 1. Fig. 13 is a vertical section, taken on line 13—13 of Fig. 12. Fig. 14 is a section, taken on the indirect line 14—14 of Fig. 1. Fig. 15 is a plan view of a bushing in which is formed the valve-seats for two adjacent cylinders and a device for distributing the vapor fuel to said cylinders. Fig. 16 is a side view of said bushing in place in one of the distributing branches for the vapor fuel, the branch being shown in section. Fig. 17 is a diagram illustrating the several positions of the rocker during a cycle of rotation of the crank-shaft.

My invention is herein shown as embodied in a four cylinder, two cycle engine, to which it is best adapted, in which the cylinders are arranged in lateral pairs, with the cylinders of each pair in alinement, and opposing each other, and with the pistons of the two cylinders of each pair connected by a rigid rod constituting the piston rods thereof, whereby the pistons of each pair of cylinders move in unison. The pistons of each pair of cylinders are separated, relatively to the positions thereof in their cylinders, the distance of a full stroke, or 180 degrees relatively to the rotation of the crank-shaft driven thereby. Each cylinder delivers an impulse at each rotation of the crank-shaft, there being four impulses from all the cylinders during one rotation of the crank-shaft.

Referring now to the details of construction of the engine herein shown, the same is made as follows: 5, 5, 5, 5 designate the four cylinders of the engine arranged in pairs, one pair at each side of the crank-shaft, and the two cylinders of each pair disposed in alinement with and opposed to each other. The cylinders are furthermore distinguished as cylinders No. 1, No. 2, No. 3 and No. 4 for the purpose of better explaining the operation of the engine hereinafter. The pistons 6 of the two cylinders of each pair are connected by piston rods 7 extending from one piston to the other, so that said pistons move in unison, one of the pistons of each pair moving outwardly to compress its charge of explosive fuel while the other connected cylinder is moving inwardly through its power stroke. The said cylinders are supported on a main frame 8 extending transversely between the pairs of cylinders and comprising upper and lower members 9, 9 and integral, vertical struts 10 and 11 connected by webs 12. The said frame is formed at its ends to provide feet 13 by which it is supported from any suitable structure, as the beams 14 shown in Figs. 1 and 4. The cylinders are attached at their inner ends to the upper and lower members of the main frame 8 in any suitable manner, and said frames are provided with openings and suitable guides 14ª through which the piston rods extend. The said upper and lower members of the frame close the inner ends of the cylinders and the guides constitute gas tight stuffing boxes or bearings through which the piston-rod extends. 15 designates the crank-shaft of the engine located between the two pairs of cylinders. Said shaft is rotatively mounted in bearings 16, 16 provided at the ends of hangers 17 which are formed integral with and depend from the lower member of the main frame 8, (Figs. 1, 2 and 4). Said crank-shaft carries a balance-wheel 18, and is provided with a hollow crank-pin 19 made integral with the cranks 20. Said crank-pin is counterbalanced by counterbalance-weights 21 formed on extensions of said cranks. The connection between the piston-rods and the crank-pin of said crank-shaft comprises a rocker designated as a whole by 22. It is made of general T-shape and comprises, in general terms, a cross-arm 23 connected centrally with a suitable sliding cross-head and at its ends with the piston-rods and a right-angle crank member 24 connected at its lower end with the crank-pin. Said rocker and its connecting parts in the engine embrace features of novelty and will be fully described hereinafter.

Each cylinder is provided with two inlet ports 25, 25 located diametrically opposite each other, and two exhaust ports 26, 26 disposed in a like relation with respect to each other and located at points in the circumference of the cylinder between the inlet ports (Figs. 4, 9 and 10). Said ports 25 of each cylinder communicate through passages 27, 27 extending partially around the cylinder with a vertical inlet passage comprising a portion 28 formed in the cylinder wall and the alined portion 28$^a$ formed in a chambered portion or casing 28$^c$ integral with the main frame, (Figs. 4 and 14). The inner or adjacent ends 28$^a$ of the inlet passages of the cylinders of each pair, formed in said casings 28$^c$, as stated, open forwardly into valve chambers 29, 29 which communicate with two branches 30 of a main supply pipe 31 for the vapor fuel, controlled by a valve 32. The two branches 30 extend in opposite directions from the main supply pipe and each communicates at its outer end with the two valve chambers 29 of two opposed cylinders. Conveniently the two valve chambers 29 of the cylinders of each pair are formed in a single casing or head 30$^a$ integral with the adjacent end of the branch 30. Each two adjacent valve chambers 29 are located on opposite sides of a distributing chamber 33, which is in open communication with the adjacent branch 30, and is separated from the valve chambers by partitions 34, 34. Said partitions are provided with alined openings to receive a bushing 35 (Figs. 14, 15 and 16), in the ends of which are formed annular seats 36 that are normally closed by spring seating valve disks 37. The said valve disks are provided with stems 38 that engage suitable guides 39 formed in bonnets 40 which have screw-threaded engagement with the ends of the casing 30$^a$. Spiral, expansively acting springs 41, interposed between interior shoulders of said bonnets and the disks hold said disks on their seats, while permitting them to open to admit charges of vapor fuel to the inlet passages in a familiar manner. The exhaust ports 26, 26, in a like manner, communicate through passages 42, 42, partially surrounding the cylinder, and branches 43 with a main exhaust pipe 44 (Figs. 2 and 7). The said distributing bushing is so constructed as to direct any free liquid fuel which may drip from the upper valves of the pairs back to the casing in a manner to prevent such fuel passing into the lower valves and thence to the lower cylinders of such pairs. If such precaution be not provided the liquid fuel condensing from the vaporous fuel would fall into the valves of the lower cylinders and destroy the uniformity of mixture in the several cylinders to such extent as to prevent the proper operation of the engine. The construction of the bushing by which this result is effected is shown best in Figs. 14, 15 and 16, and is made as follows: The said bushing, which is cylindric, is provided with a plurality of vertical and horizontal partitions 45, 46, respectively, the said vertical partitions radiating from the center to the outer wall 47 of the bushing. The said partitions or walls 45, 46 are arranged to form pockets 48, all of which open through the wall 47 of the bushing into the distributing chamber, (which surrounds said bushing) and alternate pockets open through the upper and lower horizontal partitions. There are thus formed a plurality of passages from the distributing chamber to the valve chamber, one set of which opens to the lower valve chamber 29 and the other set of which opens to the upper valve chamber, as indicated by the arrows in Fig. 16. It will be seen that any liquid fuel which falls from the upper valve into the distributing bushing falls into the upwardly opening pockets upon the lower horizontal partitions or wall, and from thence flows to the distributing chamber at a level below said lower horizontal wall or partitions. Thus such liquid fuel is prevented from falling into the lower valve chambers, and the mixture of the vapor fuel, determined by the carbureting device outside of the valve 32, is proportionally maintained in all the cylinders. The said inlet passages communicate with the inner ends of the cylinder in the manner indicated in Figs. 4 and 7, whereby the vapor fuel is drawn into the inner ends of the cylinders, as the pistons move outwardly in their compression strokes, the inlet valves opening at such times to admit the vapor fuel from the distributing chambers associated with the valve mechanisms.

The inner ends of the cylinders and the inlet passages between the valves and cylinders constitute charging pump chambers and correspond with the crank-chamber space of an ordinary two cycle engine, wherein the vapor fuel is compressed in the power stroke of the engine and from which it is delivered under its own pressure to the outer or power end of the cylinder when the piston has moved inwardly to uncover the appropriate admission or inlet port. As herein shown, the vapor under pressure is delivered to the outer end of the cylinder through suitable ports or passages which open through the outer ends of the pistons, thus delivering the charges centrally of the cylinder. The pistons are provided near their outer ends with oppositely disposed passages 50, 50 which are adapted to register with the inlet ports 25 of the cylinders when the pistons are at or near the limits of their power strokes. The passages 50 extend from the lateral faces of the pistons through the outer ends of the pistons, and the vapor fuel, which is compressed in the inlet passages during the power strokes of the piston, is forced through the piston ports or passages into the outer ends of the cylinders, when the piston and cylinder inlet ports are brought into register. The pistons are provided at their outer ends with annular conical flanges 51 which surround the openings in the pistons through which the vapor fuel is delivered into the outer ends of the cylinders, whereby the charges are directed centrally to the outer ends of the cylinders and are deflected back therefrom to force the products of combustion of the preceding explosion from the cylinder through the exhaust ports, which latter are uncovered by the pistons when the pistons are near the inner ends of their travel. The said exhaust ports are opened before the inlet ports are uncovered thereby permitting the spent gases of the preceding explosion to partially escape from the cylinders by their own pressure before new charges are admitted into the cylinders.

As herein shown, and as conveniently arranged in the construction illustrated, the said rocker 22 is of bi-lateral construction, it comprising two like parts, each consisting of a cross-arm 23 and a central depending portion 24. The said rocker has a vertical movement in a plane parallel with the axis of the cylinders and a rocking or swinging movement on a horizontal axis. It is loosely connected at its ends with the piston-rods by means permitting slight endwise movement thereof relatively to said piston-rods. The connections between the ends of the cross-arms 23 of said rocker and the piston rods will first be described and are made as follows: Each piston-rod 7, connecting the pistons of two alined cylinders, is divided, or made of two like parts, which are screw-threaded at their adjacent ends for connection with a yoke or loop 62 having an opening 63 formed to provide upper and lower guide surfaces. A block 64 is located in said loop and has horizontal guiding engagement with said upper and lower guide surfaces. Pins 65 extend through the blocks 64 and through apertures in the adjacent ends of the lateral members of the cross-arms 23 of said rocker and constitute pivotal connections between the ends of said cross-arms and the piston-rods. As herein shown, said pins, which are made of hardened steel, are hollow and longitudinally split (Fig. 8) and contain soft metal tubes 66, made of brass or like material. Tapered screw-plugs 67 have screw-threaded engagement in the ends of the inner tubes and serve to expand the tubes outwardly and expand the ends of the split hollow pins 65 into frictional contact with the walls of the openings in the cross-arms, thus effecting a rigid or tight connection between said split hollow pins and said cross-arms. Incidentally, also, the brass or soft metal tubes constitute oil chambers which are fed through suitable oil passages. The openings of the yokes 62 are horizontally longer than said blocks 64, thus permitting the ends of said cross-arms to move across the planes of the axes of the piston-rods in the operation of said rocker, as hereinafter described.

A convenient construction permitting the rocker to reciprocate vertically and to swing vertically about a horizontal pivot is shown in Figs. 2, 3 and 12 and is made as follows: The inner or adjacent faces of the struts 11 of the main frame are concavely rounded in a horizontal plane and constitute vertical guide surfaces for the outer convexly rounded surfaces of a cross-head 70 sliding vertically between said struts. Said sliding cross-head constitutes the support for the pivot of the cross-arm of the rocker. The cross-head 70, for structural reasons, is made of two parts or halves, one of which is shown in Fig. 5, each part comprising an elongated guide member 71 having the convexly rounded guide surface referred to, and a semi-circular socket member 72. The socket members of the two parts, when brought together, constitute a bearing for the hollow pin or shaft 73 (Fig. 2) which is rotatively mounted in said cross-head and extends beyond the sides thereof for non-rotative attachment with the central parts of the lateral members of said cross-arms 23, the cross-arms being provided with openings to receive said pin. As shown in Fig. 4 the said hollow pin 73 is longitudinally split and contains a tube 74 made of soft metal, as brass, which latter is expanded at its ends by tapered screw-threaded plugs 75 (Fig. 2) to non-rotatively fix said pin to the members of the cross-arm. The said inner tube constitutes an oil chamber which receives oil from passages 76, adapted for connection with suitable oil cups, not shown. The lateral parts of the depending or crank member of the rocker are connected by a cross-sleeve 77 which surrounds and has bearing on the hollow crank-pin 19 before referred to. The said sleeve 77 is longitudinally divided and the parts thereof are attached to each other and to the depending arm of the rocker by means of bolts 78, 78 which extend through lugs 79, 79 and into the lower ends of said depending member of the rocker, the whole constituting a suitable bearing box.

The pistons are so arranged in their cylinders as to transmit four driving impulses to the crank-shaft during each rotation of the shaft, or one impulse during each one-quarter of a rotation of the crank-shaft. After an explosion has occurred in one of the cylinders, therefore, and the piston therein has traveled one-half of its stroke, the compressed charge in another cylinder is ignited and the piston therein travels through the first half of its stroke while the piston in the first cylinder completes the second half of its stroke and so on throughout the cycle of operation of the engine.

The arrangement of the cylinders and pistons is shown in Fig. 4, and in Fig. 17 is diagrammatically illustrated the relation of the crank-shaft in various parts of its rotation to the positions of the connecting pins 65 of the cross-arm of the rocker during one rotation of the crank-shaft. Owing to the direct connection of the two pistons of alined cylinders on each side of the engine, the position of one piston, of one pair, in its cylinder is directly opposite to the other piston of said pair, relatively to the circle through which the crank of the crank-shaft passes; and pistons of the other pair occupy similar relation to each other but intermediate the positions of the pistons of the first named pair. That is to say, when one of the pistons of one pair of cylinders is at the limit of its power stroke, the other piston of the cylinder of the same pair is at the limit of its compression stroke, while the two pistons of the other pair of cylinders are at mid-stroke, one traveling inwardly in its power stroke and the other traveling outwardly in its compression stroke. It will be seen, therefore, that the power stroke of a given piston in one of the cylinders is followed by the power stroke of a piston in the cylinder of an opposite pair, the latter power stroke occurring in the middle of the power stroke of the first piston and so on. The positions of the pistons are such, with respect to the crank-shaft, that the crank-shaft is off dead center at the instant of the power stroke of all of the pistons.

In the arrangement of the engine, as shown in Fig. 4, the power stroke of the piston in cylinder No. 1 is followed, at the mid-stroke of said piston, by the power stroke of the piston in cylinder No. 2. At the mid-stroke of the piston in cylinder No. 2 the charge is ignited in cylinder No. 3 to produce the power stroke of the piston thereof, and at the mid-stroke of said latter piston the compressed charge is ignited in cylinder No. 4. At the mid-stroke of the latter piston, the piston in cylinder No. 1 has reached the limit of its compressive stroke and the compressed charge is ignited to effect the second power stroke of said piston. From the foregoing it will be observed that during the first half of the power stroke of cylinder No. 1 all of the pistons are traveling downwardly under the impulse of the charge just ignited in said cylinder No. 1, and of the expanding charge in cylinder No. 4, and that during this time the cross-head 70 moves vertically in its guides and functions as an ordinary cross-head to transmit power to the crank-shaft. In like manner during the first part of the power stroke of the piston of cylinder No. 3, the pistons all move again in the opposite direction, or upwardly, and the power is transmitted to the crank-shaft through the rocker acting as a cross-head. When, however, the piston of cylinder No. 1 reaches its mid-stroke, the charge in cylinder No. 2 is ignited and its piston moves inwardly in its power stroke, the pistons of the two pairs of cylinders are moving in opposite directions so that the power exerted through said rocker to turn the crank-shaft is that of a lever rotating about its pivot 73; and it is during this period that the crank portion of said rocker is oscillated to turn the crank from one side to the other of its dead center. So, also, when the piston of cylinder No. 3 reaches its mid-stroke the compressed charge in cylinder No. 4 is ignited and said piston makes its power stroke, thereby reversing the movement of one pair of said pistons, thus transmitting power through the rocker to the crank-shaft when the rocker is acting as lever. It will be observed, by reference to Figs. 4 and 17, that the cross-head reaches the upper and lower limits of its movement when the cross-arm is swinging upon its pivot and while the crank-pin is passing through its dead center. It will be furthermore observed that the neutral or dead positions of the pistons occur when the crank-pin is off of dead center, about forty-five degrees off of dead center, as herein shown. By reason of the vertical movement of said rocker, combined with its oscillating movement as described, the ends of said rocker are shifted alternately inside and outside of the planes of the axes of the cylinders, thus describing approximately an elongated figure 8, as indicated in Fig. 17. The letters of reference applied to Fig. 17 at the ends of the cross-arms and at the points on the circle representing the path of the crank indicate corresponding positions of the crank and the ends of the cross-arms in the different parts of one cycle of the crank-shaft, the indicated points on the crank-shaft being located 45 degrees apart.

The valve 32 in the main supply pipe for the vapor fuel is controlled by a suitable governor, of the balance wheel type, as herein shown. The valve comprises a suitable bushing 85 fitted within the supply pipe at the junction thereof with the branches 30, and provided with a plurality of ports 86 through which the vapor fuel passes to the said branches. The valve closure comprises a hollow cylinder 87 that fits closely within the bushing and is movable longitudinally of said bushing to cut off and open the ports 86 more or less as desired. The ports 86 are made wide at their outer ends and restricted at their inner ends so as to restrict the flow of vapor fuel therethrough when the engine is running under light load or tends to overrun, while providing an ample supply when the engine is working under a heavy load. The said closure is attached to one end of a horizontally sliding governor rod 88 that is connected at its other end to the upper end of a vertically swinging lever 89. The latter lever is pivoted near its upper end to a stationary part of the engine, as the exhaust pipe, by a pivot pin 90. The lower end of said lever is forked and sets astride a grooved collar 91 that is keyed to but slides endwise of the crank-shaft, and the fork-arms are provided with lugs 92 that enter the groove of said collar. Said collar is shifted on the shaft to control the valve closure 87 by centrifugally operating levers 93 connected with the collar and pivoted between their ends to studs 94 carried by the balance-wheel, all operating in a familiar manner to throttle the valve upon excessive speed of the engine. The levers are normally held in their normal or inoperative positions by springs 95 interposed between the levers and the balance-wheel rim and surrounding rods 96 extending between said parts.

Lubricating oil is distributed from the oil chamber within the hollow pivot pin 73 of the rocker to the crank-pin bearing and the pivot bearings at the outer ends of the cross-arms of the rocker through oil pipes or conduits 98 and 99, as shown in Figs. 1, 2 and 4. The engine is otherwise equipped with oil passages such as are required to properly lubricate the moving parts of the engine. These and other features of construction necessary to the practical operation of the engine, such as the ignition system and the means for cooling the cylinder, constitute no part of the present invention and are not herein described. The said cylinders, operating in the usual manner of a two cycle engine, constitute a plurality of single acting cylinders and, so far as the operative connection of the pistons with the crank-shaft is concerned, like results are attained regardless of the character of motive agent used. It will be obvious furthermore that my invention may be embodied in engines of other types and that many structural details of the illustrated embodiment of my invention may be varied, and I do not wish to be limited to such details, except as hereinafter made the subject of specific claims.

I claim as my invention:—

1. In an explosive engine, the combination with four single acting power cylinders arranged in lateral pairs, the cylinders of each pair opposing each other and spaced a distance apart greater than the stroke of the pistons, pistons therein and piston rods connected with said pistons, of a crank-shaft having a single crank-pin and a rocker for transmitting power successively from all of said cylinders to said single crank-pin to rotate said shaft.

2. In an explosive engine, the combination with four single acting power cylinders, their pistons and piston rods, each cylinder formed at its outer end to provide an explosive chamber and at its inner end to form a charging pump chamber in connection with which the piston operates, said cylinders being arranged in two lateral pairs with the cylinders of each pair opposing each other, the piston rods extending through the ends or heads of said charge pump chambers, of a crank-shaft having a single crank-pin, a rocker comprising an arm having rotative bearing with the crank-pin and a cross-arm the ends of which extend between the cylinders of each pair and are connected with the piston rods, the cylinders of each pair being located a distance apart greater than the stroke of the pistons.

3. In an explosive engine, the combination with four single acting power cylinders, their pistons and piston rods, each cylinder formed at its outer end to provide an explosive chamber and at its inner end to form a charging pump chamber in connection with which the piston operates, said cylinders being arranged in two lateral pairs with the cylinders of each pair opposing each other, the piston rods extending through the ends or heads of said charge pump chambers, of a crank-shaft having a single crank-pin, a sliding cross-head, a rocker pivotally mounted on said cross-head comprising an arm having rotative bearing with the crank-pin, and a cross-arm the ends of which extend between the cylinders of each pair and are connected with the piston rods, the cylinders of each pair being located a distance apart greater than the stroke of the pistons.

4. In an explosive engine, the combination with four single acting power cylinders, their pistons and piston rods, each cylinder formed at its outer end to provide an explosive chamber and at its inner end to form a charging pump chamber in connection with which the piston operates, said cylinders being arranged in two lateral pairs with the cylinders of each pair opposing each other, and a transverse frame extending between said pairs of cylinders on which the cylinders are rigidly supported, the cylinders of each pair being separated a distance apart greater than the strokes of said pistons, of a crank-shaft provided with a single crank-pin, a cross-head which has sliding engagement in guides in said frame, and a rocker pivotally mounted on said cross-head, said rocker having rotative bearing with said crank-pin and having parts which extend between and are connected with the piston rods.

5. In an explosive engine, the combination with four single acting power cylinders, their pistons and piston rods, each cylinder formed at its outer end to provide an explosive chamber and at its inner end to form a charging pump chamber in connection with which the pistons operate, said cylinders being arranged in two lateral pairs with the cylinders of each pair opposing each other, a frame extending transversely between the two pairs of cylinders upon which the cylinders are rigidly supported, and the cylinders of each pair being separated a distance apart greater than the strokes of said pistons, the inner ends or heads of said charging pump chambers being composed of fixed parts of the frame and the piston rods extending through said ends or heads of the pump chamber, of a crank-shaft having a single crank-pin, a sliding cross-head having sliding bearing in the frame, and a rocker pivotally mounted on said cross-head and having rotative bearing with the crank-pin and having parts which are connected with said piston rods.

6. The combination with four power cylinders, their pistons and piston-rods, said cylinders being arranged in opposing pairs, and a yoke connecting the inner ends of the piston rods of each pair of cylinders, of a crank-shaft provided with a single crank-pin and a rocker having a combined swinging and reciprocating motion provided with a member with which the crank-pin is rotatively connected, and with a cross-arm extending between said piston-rods, and blocks adapted to slide in said yokes transversely to the piston-rods to which said cross-arm is pivotally connected.

7. The combination with four power cylinders arranged in two opposing pairs, their pistons and piston-rods, of a crank-shaft provided with a single crank-pin, a sliding cross-head and a rocker comprising a cross-arm pivoted to said cross-head and loosely connected at its ends with the piston-rods, and an angularly disposed member with which the crank-pin is rotatively connected, the pivot between said cross-arm of the rocker and cross-head comprising a longitudinally slit hollow pin, a soft metal tube within said hollow pin and tapered plugs having screw-threaded engagement with the outer ends of the tube.

In testimony, that I claim the foregoing as my invention I affix my signature in the presence of two witnesses, this 19th day of February A. D. 1907.

THADDEUS W. HEERMANS.

Witnesses:
W. L. HALL,
GEORGE R. WILKINS.